(12) United States Patent
Schulze-Isfort et al.

(10) Patent No.: US 8,062,622 B2
(45) Date of Patent: Nov. 22, 2011

(54) TITANIUM DIOXIDE HAVING INCREASED SINTERING ACTIVITY

(75) Inventors: Christian Schulze-Isfort, Limeshain (DE); Oswin Klotz, Westerngrund (DE); Rainer Golchert, Dieburg (DE); Uwe Diener, Grosskrotzenburg (DE); Kai Schumacher, Hofheim (DE)

(73) Assignee: Evonik Degussa GmbH, Hanau (DE)

( * ) Notice: Subject to any disclaimer, the term of this patent is extended or adjusted under 35 U.S.C. 154(b) by 0 days.

(21) Appl. No.: 12/634,732

(22) Filed: Dec. 10, 2009

(65) Prior Publication Data

US 2010/0150819 A1 Jun. 17, 2010

Related U.S. Application Data

(62) Division of application No. 12/125,116, filed on May 22, 2008, now abandoned.

(60) Provisional application No. 60/940,314, filed on May 25, 2007.

(30) Foreign Application Priority Data

May 22, 2007 (EP) ..................................... 07108632

(51) Int. Cl.
*C01G 23/07* (2006.01)
*C01G 23/047* (2006.01)

(52) U.S. Cl. ......... 423/613; 423/610; 423/611; 423/612

(58) Field of Classification Search .................. 106/436; 423/610–616
See application file for complete search history.

(56) References Cited

U.S. PATENT DOCUMENTS

2005/0214200 A1 9/2005 Surender et al.
2007/0144076 A1 6/2007 Schumacher et al.

FOREIGN PATENT DOCUMENTS

| DE | 102004055165 | 6/2005 |
| EP | 1 243 555 | 9/2002 |
| EP | 1 683 763 | 7/2006 |
| WO | WO 96/06803 | 3/1996 |
| WO | WO 2005054136 A1 | 6/2005 |

OTHER PUBLICATIONS

Chemical Abstracts, American Chemical Society, Columbus, US, Vo. 122, No. 7, Apr. 3, 1995, XP 000662406.

*Primary Examiner* — Stanley Silverman
*Assistant Examiner* — Brian Walck
(74) *Attorney, Agent, or Firm* — Oblon, Spivak, McClelland, Maier & Neustadt, L.L.P.

(57) ABSTRACT

A crystalline titanium dioxide powder, containing aggregated primary particles, wherein a BET surface area of the aggregated primary particles is from 30 to 65 m²/g, and a rutile content of a sum of crystalline modifications in the crystalline titanium dioxide is from of 50-70%.

17 Claims, No Drawings

TITANIUM DIOXIDE HAVING INCREASED SINTERING ACTIVITY

CROSS REFERENCE TO RELATED APPLICATIONS

This application claims priority to European Application No. EP 07108632.6, filed May 22, 2007, and U.S. Provisional Patent Application 60/940,314, filed May 25, 2007, the disclosures of which are incorporated herein by reference in their entireties.

FIELD OF THE INVENTION

The invention relates to a titanium dioxide powder having increased sintering activity, its preparation and use.

BACKGROUND OF THE INVENTION

It is known that titanium dioxide can be prepared by means of pyrogenic processes.

For the purposes of the present invention, pyrogenic processes are flame oxidations or flame hydrolyses. In flame oxidation, a titanium dioxide precursor, for example titanium tetrachloride, is oxidized by means of oxygen according to equation 1a. In flame hydrolysis, titanium dioxide is formed by hydrolysis of the titanium dioxide precursor, with the water necessary for the hydrolysis coming from combustion of a fuel gas, for example hydrogen, with oxygen (equation 1b).

$$TiCl_4 + O_2 \rightarrow TiO_2 + 2\,Cl_2 \quad \text{(equation 1a)}$$

$$TiCl_4 + 2\,H_2O \rightarrow TiO_2 + 4\,HCl \quad \text{(equation 1b)}$$

The titanium dioxide is generally present in the crystalline modifications anatase and rutile. As described below, conventional methods of preparation are focused on maximizing the proportion of anatase.

WO 96/06803 describes a process for preparing titanium dioxide by means of combination of flame oxidation and flame hydrolysis. Here, a gaseous titanium tetrachloride and oxygen are mixed in a reaction zone and the mixture is heated in a flame produced by combustion of a hydrocarbon as fuel gas. Titanium dioxide powders which have a high content, up to 100%, of the anatase modification are obtained.

Powder Technology 86 (1996) 87-93 describes a flame oxidation process which is carried out in a diffusion reactor. The rutile content is a maximum 6% of in a range of BET surface areas of about 40-60 m²/g.

DE-A-102004055165 discloses a titanium dioxide powder which is prepared by flame hydrolysis and has a BET surface area of from 20 to 200 m²/g. Although the anatase/rutile ratio is said to be able to be varied in a range from 2:98 to 98:2 at a given surface area, the examples show that the proportion of anatase clearly dominates. In a range of BET surface areas of about 40-50 m²/g in particular, the anatase content is at least 71%.

JP-A-10251021 describes three titanium dioxide powders which can be obtained by flame oxidation and have BET surface areas of 3.2, 28 and 101 m²/g and a rutile content of 97, 32 and 15%, respectively.

Titanium dioxide powder, having a high sintering activity is desirable for use, for example, in the ceramics industry. However, due to the complexity of pyrogenic processes, control is limited to only a few product physical parameters.

DETAILED DESCRIPTION OF THE INVENTION

It was therefore an object of the present invention to provide a titanium dioxide powder which has a high sintering activity.

A further object of the invention was to provide a process for preparing this titanium dioxide powder.

In one embodiment, the invention provides a crystalline titanium dioxide powder in the form of aggregated primary particles having a BET surface area of 30-65 m²/g and a rutile content of 50-70%.

The rutile content is the percentage of the sum of the crystalline modifications rutile and anatase which add up to 100%. The rutile content includes all values and subvalues therebetween, especially including from 51 to 69%, from 52 to 68%, from 53 to 67%, from 54 to 67%, and preferably from 55 to 65%.

The BET surface area of the titanium dioxide powder of the invention includes all values and subvalues therebetween, especially including from 35 to 60 m²/g and particularly preferably from 40 to 55 m²/g.

It is generally the case that no further crystalline modifications in addition to rutile and anatase can be detected in X-ray diffraction patterns of the titanium dioxide powder of the invention.

For the purposes of the invention, primary particles are particles which are initially formed in the reaction and can grow together to form aggregates in the further course of the reaction.

For the purposes of the invention, aggregates are primary particles of similar structure and size which have grown together, with the surface area of the aggregate being smaller than that of the sum of the individual, isolated primary particles. A plurality of aggregates or individual primary particles can also be combined to form agglomerates. Here, aggregates or primary particles are in point contact with one another. Agglomerates can in each case be broken into primary particles and/or aggregates by introduction of energy as a function of the degree to which the particles or aggregates in them are grown together.

The proportion of aggregates and/or agglomerates having a diameter of more than 45 µm in the titanium dioxide powder of the invention may be in the range from 0.0001 to 0.05% by weight. The proportion of aggregates and/or agglomerates having a diameter of more than 45 µm in the titanium dioxide powder of the invention includes all values and subvalues therebetween, especially including 0.005 to 0.03%, 0.001 to 0.01%, and 0.002 to 0.005% by weight. Particular preference is given to the range from 0.002 to 0.005% by weight.

The titanium dioxide powder of the invention can contain residues of chloride. The chloride content is preferably less than 0.1% by weight. The chloride content includes all values and subvalues therebetween, especially including from 0.0001% to 0.09%, 0.0005% to 0.08%, 0.0025% to 0.07%, 0.0075% to 0.06% and 0.01% to 0.05% by weight. Particular preference is given to a titanium dioxide powder according to the invention having a chloride content in the range from 0.01 to 0.05% by weight.

The tamped density of the titanium dioxide powder of the invention is not limited. However, it has been found to be advantageous for the tamped density to be from 20-200 g/l.

The tamped density includes all values and subvalues therebetween, especially including from 30-190g/l, 40-180 g/l, 50-170 g/l, 60-160 g/l, 70-150 g/l and 80-140 g/l. A tamped density from 30-120 g/l may be particularly preferred.

In a second embodiment, the invention further provides a process for preparing the titanium dioxide powder of the invention, comprising:

introducing at a controlled rate for each stream, separate streams of titanium tetrachloride vapour; hydrogen, and air or oxygen-enriched air into a mixing chamber, igniting the mixture of titanium tetrachloride vapour, hydrogen and primary air in a burner;

burning the flame into a reaction chamber; and separating from the gaseous substances, the solid $TiO_2$ formed in the burning;

wherein the controlled rates are selected according to the equation:

$$A=10^5\{[(TiCl_4 \times H_2)/(\text{amount of air} \times \text{total gas})]/BET]\}$$

wherein

A is a value of from 6-12 $g/m^2$, $TiCl_4$ is the controlled rates for introducing the titanium tetrachloride vapour in units of kmol/h, $H_2$ is the controlled rate for introducing the hydrogen in units of kmol/h, amount of air is the controlled rate for introducing air in units of kmol/h, total gas is the total controlled rate of all the gases in kmol/h, and BET is expressed in units of $m^2/g$.

The total amount of gas is made up of titanium tetrachloride, hydrogen, primary air and, optionally, secondary air.

The titanium tetrachloride is preferably vaporized at temperatures of less than 200° C.

In a third embodiment, the process of the invention may be carried out with secondary air being introduced into the reaction chamber in addition to the primary air introduced into the mixing chamber. In this embodiment, it has been found to be advantageous for the ratio of the controlled rates of primary air/secondary air to be from 10:1 to 1:10. This ratio includes all values and subvalues therebetween, especially including 9:1, 8:1, 7:1, 6:1, 5:1, 4:1, 3:1, 2:1, 1:1, 0.9:1, 0.8:1, 0.7:1, 0.6:1, 0.5:1, 0.4:1, 0.3:1, and 0.2:1. Particular preference is given to the range from 4.5:1 to 0.3:1. To be able to meter the amount of secondary air precisely, it may be necessary to allow the flame to burn into a reaction chamber closed off from the surrounding air. In this manner, precise control of process parameters is possible.

In a fourth embodiment, the primary air and/or secondary air may be enriched with oxygen or the primary air and/or secondary air may be preheated. According to the invention, "preheated" means that the temperature of the air is heated to a range of from 50° C. to 500° C., before introduced to the mixing chamber and/or the reaction chamber. This temperature range includes all values and subvalues therebetween, especially including 60° C. to 475° C., 70° C. to 450° C., 80° C. to 425° C., 90° C. to 400° C. and 100° C. to 375° C.

Furthermore, the reaction may preferably be carried out at a lambda value in the range from 1 to 9 and a gamma value in the range from 1 to 9.

Oxides prepared by flame hydrolysis are usually obtained at a stoichiometric ratio of the gaseous starting materials which is such that the hydrogen introduced is at least sufficient to react with the chloride from $TiCl_4$ to form HCl. The amount of hydrogen required for this is referred to as the stoichiometric amount of hydrogen.

The ratio of the moles of hydrogen introduced to the mixing chamber to the above-defined stoichiometrically required molar amount of hydrogen is defined as gamma according to the following equation:

$$\text{gamma}=H_2 \text{ fed in (mole)/stoichiometric } H_2 \text{ (mole)}.$$

In the case of oxides prepared by flame hydrolysis, it is also usual to use an amount of oxygen (for example from air) which is at least sufficient to convert $TiCl_4$ into titanium dioxide and convert any excess hydrogen still present into water. This amount of oxygen is referred to as the stoichiometric amount of oxygen.

In an analogous way, the ratio of the total number of moles of oxygen fed to the mixing chamber and the reaction chamber to the stoichiometrically required molar amount of oxygen is defined as lambda according to the following equation:

$$\text{lambda}=O_2 \text{ fed in (mole)/stoichiometric } O_2 \text{ (mole)}.$$

After gaseous substances have been separated off, the titanium dioxide powder may preferably be treated with steam. This treatment serves first and foremost to remove chloride-containing groups from the surface. At the same time, this treatment reduces the number of agglomerates. The process may be carried out continuously by treating the powder with steam, optionally, together with air, in cocurrent or countercurrent manner. The temperature at which the treatment with steam is carried out is in the range of from 250° C. to 750° C. This treatment temperature includes all values and subvalues therebetween, especially including 300° C. to 700° C., 350° C. to 650° C., 400° C. to 600° C. and 450° C. to 550° C., with values in the range of from 450° C. to 550° C. being preferred.

In a fifth embodiment, the invention further discloses a method for preparing ceramic materials comprising sintering the titanium dioxide powder of the invention, the ceramic material prepared by this method and articles comprising the ceramic material prepared by this method.

Having generally described this invention, a further understanding can be obtained by reference to certain specific examples which are provided herein for purposes of illustration only, and are not intended to be limiting unless otherwise specified.

EXAMPLES

Analytical Methods

The BET surface area was determined in accordance with DIN 66131. The tamped density was determined by a method based on DIN ISO 787/XI K 5101/18 (not sieved).

The bulk density was determined in accordance with DIN ISO 787/XI.

The pH was determined by a method based on DIN ISO 787/IX, ASTM D 1280, JIS K 5101/24.

The proportion of particles larger than 45 µm was determined in accordance with DIN ISO 787/XVIII, JIS K 5101/20.

Determination of the chloride content: about 0.3 g of the particles according to the invention was weighed out precisely, admixed with 20 ml of 20 per cent strength sodium hydroxide solution (analytical reagent), dissolved and introduced while stirring into 15 ml of cooled $HNO_3$. The chloride content of the solution was titrated with $AgNO_3$ solution (0.1 mol/l or 0.01 mol/l).

Example 1 (According to the Invention)

0.042 kmol/h of $TiCl_4$ vapour was introduced into a mixing chamber. Separately therefrom, 0.19 kmol/h of hydrogen and 0.683 kmol/h of primary air were introduced into the mixing chamber. The reaction mixture was fed to a burner and ignited. The flame burned into a water-cooled flame tube. In addition, 0.892 kmol/h of secondary air was introduced into the reaction space. The powder formed was separated off in a downstream filter and subsequently treated in countercurrent with air and steam at 520° C.

The factor A calculated from the amounts of starting materials is 8.2 g/m². The titanium dioxide powder had a BET surface area of 34 m²/g and a rutile content of 54%.

Examples 2 to 7 according to the invention were carried out analogously. Amounts of starting materials and BET surface area and rutile content of the powders obtained are reported in the table.

Comparative Examples C1 to C10 were likewise carried out in a manner analogous to Example 1, but the amounts of starting materials were selected so that the factor A is outside the range according to the invention. The resulting titanium dioxide powders had BET surface areas and rutile contents which are outside the range according to the invention.

C11 and C12 represent commercially available titanium dioxide powder. C11 is Aeroxide® TiO$_2$ P25, C12 is Aeroxide® VP TiO$_2$ P90, both Degussa.

The experimental data and results for each of the Examples and Comparative Examples are shown in the Table.

The titanium dioxide powders of the Examples 1 and 3 according to the invention were compared with respect to their sintering activity to the powders of Comparative Examples C4 and C5 which have comparable BET surface areas. The percentage decrease in the BET surface area demonstrates the significantly higher sintering activity of the titanium dioxide powders of Examples 1 and 3.

separating from the gaseous substances, the solid TiO$_2$ formed in the burning; to obtain the crystalline titanium dioxide powder;

wherein the controlled rates are selected according to the equation:

$$A = 10^5 \{[(\text{TiCl}_4 \times \text{H}_2)/(\text{amount of air} \times \text{total gas})]/\text{BET}\}$$

wherein

A is a value of from 6-12 g/m²,

TiCl$_4$ is the controlled rates for introducing the titanium tetrachloride vapour in units of kmol/h, H$_2$ is the controlled rate for introducing the hydrogen in units of kmol/h, amount of air is the controlled rate for introducing air in units of kmol/h, total gas is the total controlled rate of all the gases in kmol/h, and BET is expressed in units of m²/g;

wherein said crystalline titanium dioxide powder comprises:
aggregated primary particles,
wherein
a BET surface area of the aggregated primary particles is from 40-60 m²/g, and

TABLE 1

Amounts of starting materials, BET surface area and rutile content of the titanium dioxide powders obtained

| Example | TiCl$_4$ kmol/h | H$_2$ kmol/h | Air Primary kmol/h | Air Secondary kmol/h | Air Total kmol/h | Total O$_2$ kmol/h | Total gas kmol/h | gamma | lambda | A g/m² | Rutile % | BET m²/g | BET** % |
|---|---|---|---|---|---|---|---|---|---|---|---|---|---|
| 1 | 0.042 | 0.19 | 0.683 | 0.892 | 1.575 | 0.331 | 1.81 | 2.25 | 1.51 | 8.2 | 54 | 34 | 62 |
| 2 | 0.042 | 0.127 | 0.446 | 0.803 | 1.249 | 0.262 | 1.42 | 1.51 | 1.47 | 8.9 | 57 | 34 | — |
| 3 | 0.042 | 0.19 | 0.455 | 0.803 | 1.258 | 0.264 | 1.49 | 2.25 | 1.01 | 11.2 | 66 | 38 | 66 |
| 4 | 0.042 | 0.127 | 0.306 | 0.803 | 1.109 | 0.233 | 1.28 | 1.51 | 1.01 | 10.8 | 65 | 35 | — |
| 5 | 2.53 | 14.28 | 62.46 | 15.17 | 77.63 | 16.302 | 94.44 | 2.82 | 1.84 | 11.0 | 50 | 45 | — |
| 6 | 0.137 | 0.962 | 2.76 | 1.76 | 4.52 | 0.949 | 5.62 | 3.5 | 1.2 | 8.8 | 65 | 59 | — |
| 7 | 0.137 | 0.962 | 2.76 | 2.71 | 5.47 | 1.149 | 6.57 | 3.5 | 1.2 | 6.1 | 45 | 60 | — |
| C1 | 1.92 | 6.1 | 47.12 | 15.53 | 62.65 | 13.157 | 70.67 | 1.59 | 3.27 | 5.2 | 16 | 51 | — |
| C2 | 1.92 | 5.43 | 47.46 | 15.53 | 62.99 | 13.228 | 70.34 | 1.41 | 3.68 | 4.6 | 12 | 51 | — |
| C3 | 1.92 | 6.1 | 48.15 | 22.51 | 70.66 | 14.839 | 78.68 | 1.59 | 3.31 | 4.2 | 15 | 50 | — |
| C4 | 0.0079 | 0.067 | 0.161 | 0.419 | 0.58 | 0.122 | 0.65 | 4.24 | 1.01 | 4.5 | 26 | 31 | 35 |
| C5 | 0.0053 | 0.067 | 0.12 | 0.419 | 0.539 | 0.113 | 0.61 | 6.35 | 0.76 | 4.0 | 8 | 27 | 33 |
| C6 | 0.137 | 1.885 | 15.951 | 5.8 | 21.751 | 4.568 | 23.77 | 6.88 | 3.55 | 0.5 | 7 | 91 | — |
| C7 | 0.0066 | 0.027 | 0.223 | 0.535 | 0.758 | 0.159 | 0.79 | 2.03 | 3.5 | 0.4 | 20 | 77 | — |
| C8 | 0.0066 | 0.02 | 0.21 | 0.535 | 0.745 | 0.156 | 0.77 | 1.49 | 4.49 | 0.3 | 14 | 75 | — |
| C9 | 0.0032 | 0.022 | 0.24 | 0.535 | 0.775 | 0.163 | 0.80 | 3.46 | 4.52 | 0.1 | 11 | 102 | — |
| C10* | 1.92 | 6.54 | 48.41 | 15.23 | 63.64 | 13.364 | 72.10 | 1.7 | 3.1 | 5.4 | 23 | 51 | — |
| C11* | 0.137 | 2.07 | 20.35 | 4.9 | 25.25 | 5.303 | 27.46 | 7.56 | 4.1 | 0.5 | 5 | 90 | — |

C10: Aeoroxide ® TiO$_2$ P25,
C11: Aeroxide ® TiO$_2$ VP P90;
**% decrease in the BET surface area of each example after calcining at 800° C./3 h Numerous modifications and variations on the present invention are possible in light of the above teachings. It is therefore understood that within the scope of the appended claims, the invention may be practiced otherwise than as specifically described herein.

The invention claimed is:

1. A method for the preparation of a crystalline titanium dioxide powder, comprising:
    introducing at a controlled rate for each stream, separate streams of titanium tetrachloride vapour; hydrogen, and air or oxygen-enriched air into a mixing chamber,
    igniting the mixture of titanium tetrachloride vapour, hydrogen and primary air in a burner;
    burning the flame into a reaction chamber; and a rutile content of a sum of crystalline modifications in the crystalline titanium dioxide is from 50-70%.

2. The method according to claim 1, further comprising:
    vaporizing the titanium tetrachloride, wherein a temperature for the vaporizing is less than 200° C.

3. The method according to claim 1, further comprising:
    introducing a secondary air stream at a controlled rate into the reaction chamber.

4. The method according to claim 3, wherein a ratio of the primary air controlled rate to secondary air controlled rate is in a range of from 10:1 to 1:10.

5. The method according to claim 3, wherein at least one of the primary air stream and secondary air stream is preheated to a temperature of from 50° C. to 500° C.

6. The method according to claim 3, wherein at least one of the primary air stream and secondary air stream is enriched with oxygen.

7. The method according to claim 1, wherein a value of gamma is in a range from 1 to 9, and gamma is a ratio of moles hydrogen introduced into the mixing chamber to a stoichiometric molar amount of hydrogen based on a molar amount of titanium tetrachloride introduced into the mixing chamber.

8. The method according to claim 1, wherein a value of lambda is in a range of from 1 to 9, and lambda is a ratio of the molar amount of oxygen introduced to the mixing chamber to a stoichiometric molar amount of oxygen based on the molar amount of titanium tetrachloride introduced into the mixing chamber.

9. The method according to claim 3, wherein a value of lambda is in a range of from 1 to 9, and lambda is a ratio of the molar amount of oxygen introduced to the mixing chamber and the reaction chamber to a stoichiometric molar amount of oxygen based on the molar amount of titanium tetrachloride introduced into the mixing chamber.

10. The method according to claim 1, further comprising: treating the separated $TiO_2$ with steam and optionally air, wherein a temperature of the steam treatment is in the range of from 250 to 750° C.

11. The method according to claim 3, further comprising: treating the separated $TiO_2$ with steam and optionally air, wherein a temperature of the steam treatment is in the range of from 250 to 750° C.

12. The method according to claim 1, wherein the BET surface area of the aggregated primary particles of the crystalline titanium dioxide powder is from 40 to 55 m²/g.

13. The method according to claim 1, wherein the rutile content of the crystalline titanium dioxide powder is from 50-60%.

14. The method according to claim 1, wherein, in the crystalline titanium dioxide powder, a proportion of aggregates and/or agglomerates having a diameter of more than 45 μm is in a range of from 0.0001 to 0.05% by weight.

15. The method according to claim 1, wherein a chloride content of the crystalline titanium dioxide powder is in a range of from 0.0001 to 0.1% by weight.

16. The method according to claim 1, wherein a tamped density of the titanium dioxide powder is in a range from 20 to 200 g/l.

17. The method according to claim 1, wherein a sintering activity of the crystalline titanium dioxide powder, as measured by a % decrease in BET upon treatment at 800° C. for 3 hours, is greater than 60%.

* * * * *